No. 891,574. PATENTED JUNE 23, 1908.
H. J. SWAIN.
LOCK NUT.
APPLICATION FILED OCT. 31, 1906.

WITNESSES
W. P. Burke
M. Petit

INVENTOR
Henry James Swain
By Richardson
ATTYS

UNITED STATES PATENT OFFICE.

HENRY JAMES SWAIN, OF SYDENHAM, NEAR SYDNEY, NEW SOUTH WALES, AUSTRALIA, ASSIGNOR TO HARRY BOSTOCK AND JOHN ANGELL PECK, OF SYDNEY, AUSTRALIA.

LOCK-NUT.

No. 891,574.    Specification of Letters Patent.    Patented June 23, 1908.

Application filed October 31, 1906. Serial No. 341,412.

*To all whom it may concern:*

Be it known that I, HENRY JAMES SWAIN, subject of the King of Great Britain and Ireland, and residing at Sydenham Road, Sydenham, near Sydney, New South Wales, Australia, have invented new and useful Improvements in Lock-Nuts, of which the following is a specification.

The main features of this invention are a saucer shaped washer having ribs on its upper or convex surface and corresponding grooves on its lower or concave surface, and also grooves on the under side of the nut and the head of the bolt, such grooves being adapted to receive the ribs on the convex surface of the washer.

A further locking improvement consists in interposing between the saucer washer and the plate to be secured, a helical spring washer that is provided with a tooth or cog adapted to enter into one of the grooves on the concave side of the washer. When the nut is screwed down, the ribs on the convex side of the washer will enter into the corresponding grooves under the nut or head, and the washer (which is resilient and formed of tempered spring steel) will be flattened out. If the helical toothed washer is interposed between the saucer washer and the plate to be bolted, the concave washer will not be flattened out, but the helical washer will be compressed.

Figure 1:
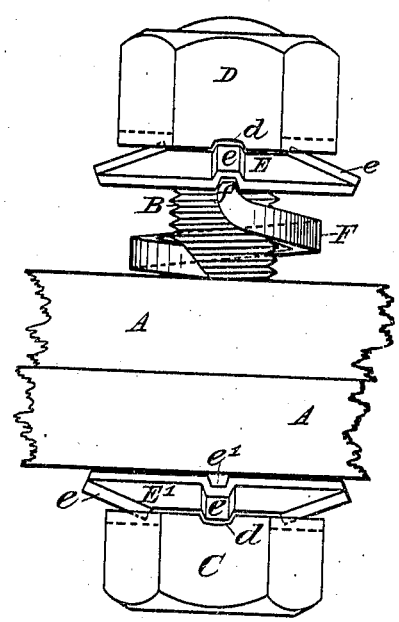
Figure 2:
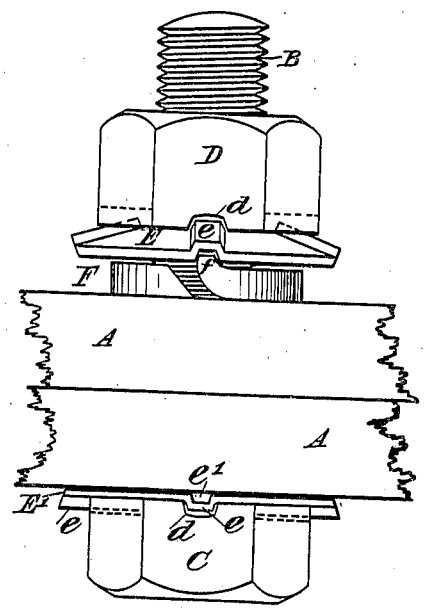
Figure 3:
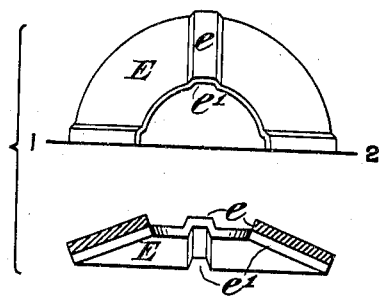
Figure 4:
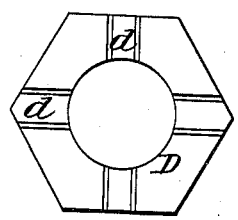

In the accompanying drawings:—Figure 1 is an elevation of the appliance as it will be when ready for the nut to be screwed down, the helical toothed washer being interposed between the saucer washer and the plate, and another washer underneath the head of the bolt. Fig. 2 is a similar view but with the nut screwed down. Fig. 3 is a half plan of the convex side of the washer, and a vertical section of the same on the line 1—2. Fig. 4 is an underneath plan of the nut or the head, showing the grooves.

A, A, are the metal plates that are to be bolted together. B is the bolt, C the head thereof, D the nut, E, E' the saucer washers, F the helical spring toothed washer. The saucer washers E are placed underneath the nuts D, and above the toothed washers F, the saucer washers E' are placed under the head C of the bolt. The head C and the nut D have two or more radial grooves $d$ on their under side. The saucer washers E, E' have radial ribs $e$ upon their convex surface, and corresponding grooves $e'$ upon their concave surface. The ribs $e$ are adapted to lie within the grooves $d$ under the head C of nut D of the bolt B. The saucer washers E, E' are made of spring steel, are elastic, and when screwed down, as shown in Fig. 2, will be flattened out, thus firmly locking the nut in its screwed down position. When it is desired to relax the nut the latter merely requires to be unscrewed and the resilience of the saucer washer will assist the operation.

In some cases it is considered advisable to assist the locking of the nut by interposing a helical spring washer, such as F, between the concave side of the saucer washer E and the plate A. The washer F is provided with a tooth or cog $f$ which is adapted to enter one of the grooves $e'$ on the concave side of the washer E, and, when the nut D is screwed down, the washer F will be flattened, as shown in Fig. 2. In the drawings, the saucer washers E, E' are shown respectively with the spring toothed washer F under the nut D, but not under the head C. In this way the effect, upon the washers E, E', of screwing down the nut may be observed in both cases.

Having now described my invention, what I claim as new and desire to secure by Letters Patent is:—

A lock nut comprising a circular shaped washer of concave shape on one side and convex on the other, radial ribs of substantially rectangular form on the convex side of said washer and the concave side thereof having correspondingly shaped grooves, and a nut having radial grooves of substantially rectangular form on its under side, said grooves being adapted to receive the ribs on the washer.

In testimony whereof I have signed my name to this specification in the presence of two subscribing witnesses.

HENRY JAMES SWAIN.

Witnesses:
MANFIELD NEWTON,
ALBERT MASSEY.